United States Patent [19]

Rotter

[11] Patent Number: 5,203,519

[45] Date of Patent: Apr. 20, 1993

[54] TAPE CARTRIDGE DRIVE BELT HAVING A LOW RATIO OF STATIC TO DYNAMIC FRICTION

[75] Inventor: Gerhard Rotter, Mission Viejo, Calif.

[73] Assignee: Athana Incorporated, Torrance, Calif.

[21] Appl. No.: 662,755

[22] Filed: Mar. 1, 1991

[51] Int. Cl.⁵ .............................................. B65H 20/06
[52] U.S. Cl. .................................................... 242/192
[58] Field of Search ......................... 242/192; 226/170; 474/249

[56] References Cited

U.S. PATENT DOCUMENTS

| | | | |
|---|---|---|---|
| 3,692,255 | 9/1972 | Von Behren | 242/192 |
| 4,342,809 | 8/1982 | Newell | 242/192 |
| 4,422,598 | 12/1983 | Groenewegen et al. | 242/192 |
| 4,466,564 | 8/1984 | Smith et al. | 242/192 |
| 4,739,951 | 4/1988 | Zeavin | 242/209 |

FOREIGN PATENT DOCUMENTS 2099954 12/1982 United Kingdom ................. 242/192

Primary Examiner—Daniel P. Stodola
Assistant Examiner—John Q. Nguyen
Attorney, Agent, or Firm—Freilich Hornbaker Rosen

[57] ABSTRACT

An elastomer drive belt (100), for a bidirectional two reel tape cartridge (20), having a low static to dynamic coefficient of friction ratio with the magnetic tape (38) is provided. The drive belt minimizes slip point (96) movement between the belt and the magnetic tape on the take up reel. This results in a minimization of tape tension variations at the transducer head (42).

8 Claims, 3 Drawing Sheets

TAPE CARTRIDGE DRIVE BELT HAVING A LOW RATIO OF STATIC TO DYNAMIC FRICTION

FIELD OF THE INVENTION

The present invention pertains to belt driven tape cartridges and more particularly, to drive belts therefor.

BACKGROUND OF THE INVENTION

In a bidirectional drive tape cartridge of the type shown in U.S. Pat. No. 3,692,255 in which tape moves at high speeds between two reels and is subjected to high accelerations when the tape direction is reversed, it is important to minimize tape tension variations at the transducer head. Otherwise tape to head contact may be lost and data compromised.

U.S. Pat. Nos. 4,581,189 and 4,466,564 disclose drive belts, typically made of polyurethane, for use in such tape cartridges particularly configured to minimize tape tension variations characterized as flutter. More particularly, the disclosed drive belts are described as having a microscopically rough surface with peak-to-peak roughness ranging in size between 0.2 and 40 micrometers to promote the release of air from between the belt and the tape. This surface roughness, it is believed, is intended to overcome the inherent tendency of polyurethane to exhibit slip-stick motion.

SUMMARY OF THE INVENTION

The present invention is directed to an improved drive belt for magnetic tape cartridges configured to minimize slip-stick motion between the drive belt and the magnetic tape. In accordance with the invention, this is accomplished by configuring the drive belt surface to achieve a low ratio of static to dynamic coefficient of friction between the belt surface and the magnetic tape, i.e. <2.

In a preferred embodiment, the belt is made of a polyester elastomer material having a smooth surface, e.g. <4μ" (microinches), such as Hytrel sold by DuPont. Hytrel is a polyester copolymer comprised of a hard segment of polybutylene terephthalate and a soft segment of polyether glycols.

In alternative embodiments, the low ratio of static to dynamic friction can be achieved by coating the belt with a thin layer of a polyester polymer, adding a friction reducing additive or polymer such as a fluorocarbon additive, second polymer or copolymer to the belt material or utilizing a macroscopic belt surface.

The novel features of the invention are set forth with particularity in the appended claims. The invention will be best understood from the following description when read in conjunction with the accompanying drawings.

DETAILED DESCRIPTION

Figure 1:
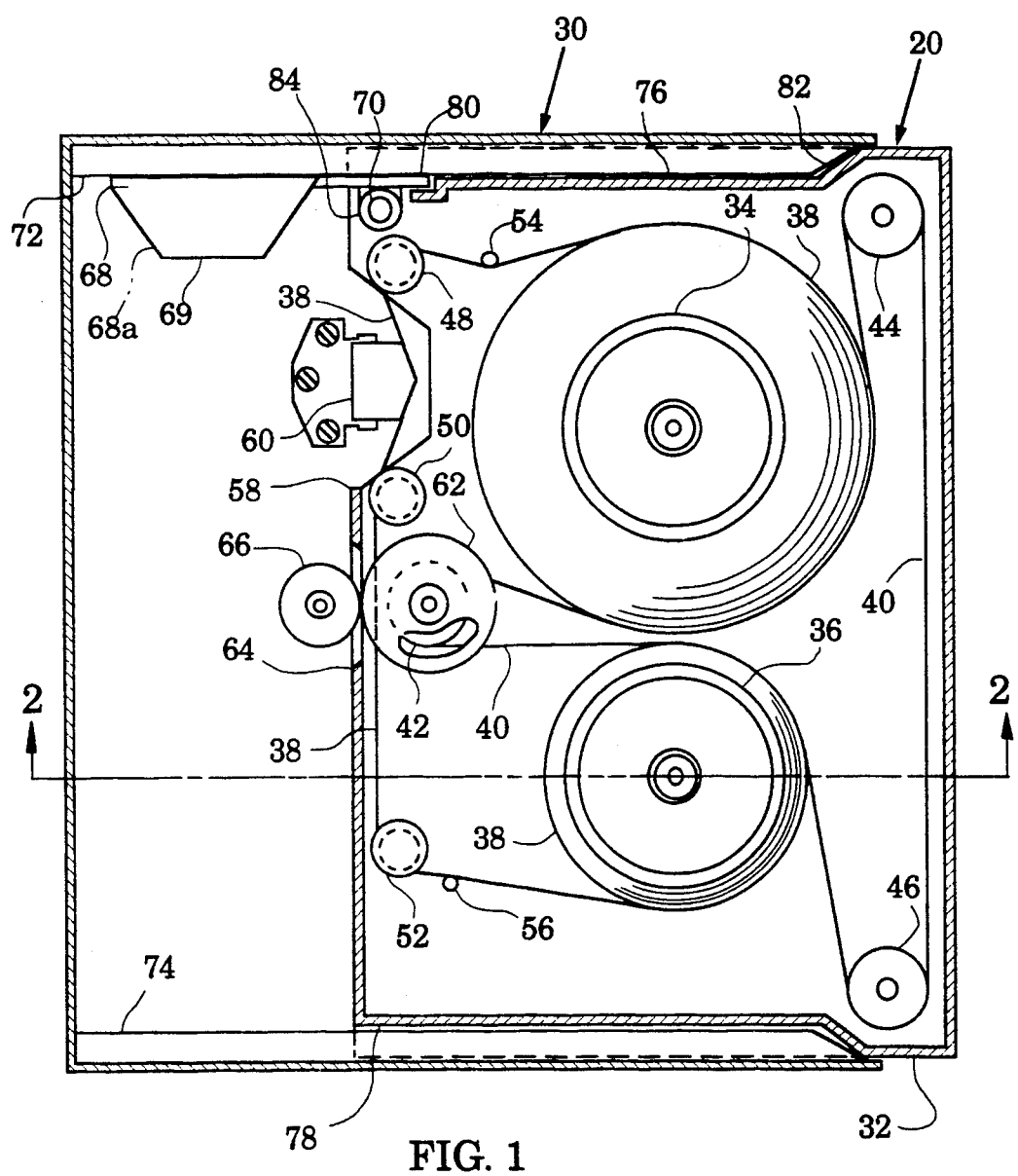
FIG. 1 is a sectional plan view of a tape cartridge in a support deck.

FIG. 1 is a sectional view of an exemplary belt driven tape cartridge 20 which can advantageously employ the improved drive belt in accordance with the present invention. The tape cartridge 20, which is shown positioned in a support deck 30, has a shell 32 in which a pair of reels 34, 36 are mounted with a magnetic tape 38 convolutely wound thereon. A resilient belt 40 closely contacts the tape 38 wound about each reel 34, 36. The belt 40 also is led around a belt drive roller 42 and a pair of belt guide rollers 44, 46. Thus the belt 40 moves linearly in response to rotation of the belt drive roller 42 to cause the reels 34, 36 to rotate by means of surface friction between the belt 40 and the magnetic tape 38.

Between the reels 34, 36 the magnetic tape 38 passes around three tape guides 48, 50, and 52. Between the reel 34 and the tape guide 48, the magnetic tape 38 is led over a tape wrap pin 54. The magnetic tape 38 passes over a similar tape wrap pin 56 between the reel 36 and the tape guide 52. The tape guides 48, 50 are positioned on either side of an opening 58 in the shell 32 where a transducer head 60, mounted on the support deck 30, contacts the magnetic tape 38.

The belt drive roller 42 has a rim portion 62 which contacts, through an aperture 64 in the shell 32, a drive roller 66 which extends up from the support deck 30. Thus the drive roller 66, through the belt drive roller 42 and its rim 62, can drive the belt 40 in either direction causing the magnetic tape 38 to pass over the transducer head 60 as it is exchanged between the reels 34, 36.

A door 68, having a flange 69 corresponding to the opening 58, is pivotally mounted on a pivot stud 70 and covers the opening 58 except when the tape cartridge 20 is inserted into the support deck 30. When inserted, cartridge guides 72, 74 in the support deck slide into recesses 76, 78 in the shell 32 and a tab 80 on the door 68 is pushed aside by the bevel 82 on the guide 72. The door 68 thus swings to the open position 68a shown in FIG. 1 making the magnetic tape 38 available for contact with the transducer head 60 through the opening 58. The door 68 is urged by a spring 84 which causes it to close over the opening 58 upon removal of the tape cartridge 20 from the support deck 30.

Figure 2:
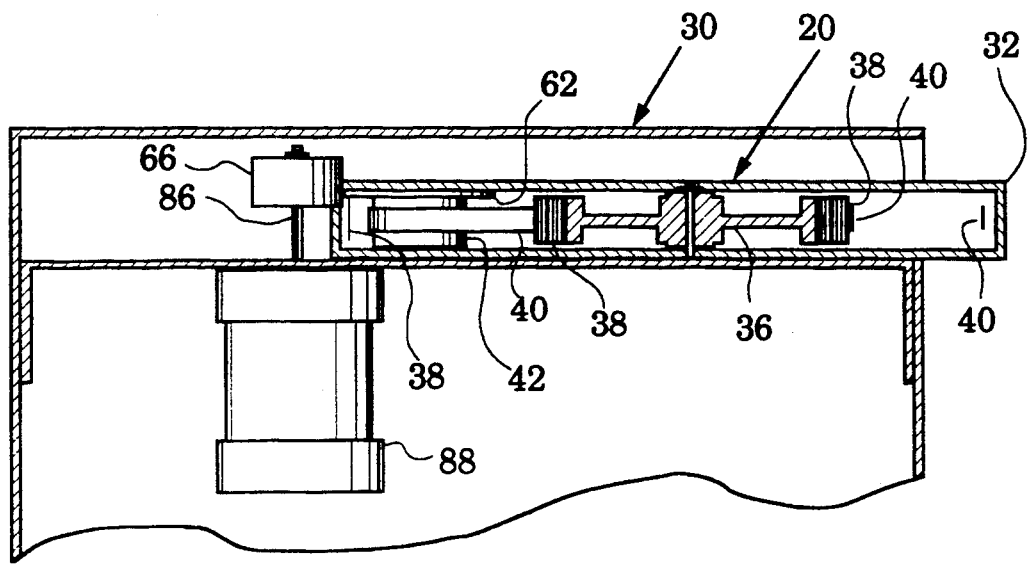
FIG. 2 is a sectional view along the line 2—2 of FIG. 1.

FIG. 2 is a view along the line 2—2 of FIG. 1 and shows the tape cartridge 20 in the support deck 30. The drive roller 66 extends upward on a drive shaft 86 from a reversible motor 88 and contacts the rim 62 of the belt drive roller 42 through the aperture (64 in FIG. 1) in the shell 32. The belt 40 is seen to contact the belt drive roller 42 and the magnetic tape 38 convolutely wound on the reel 36. The magnetic tape 38 is also shown passing under the rim 62 of the belt drive roller 42.

The reels 34, 36, the belt drive roller 42 and the belt guide rollers 44, 46 shown in FIGS. 1 and 2 are rotatably mounted on axles which are fixed in the shell 32. The belt drive roller 42 and the belt guide rollers 44, 46 are preferably crowned to keep the belt 40 positioned thereon.

Figure 3:
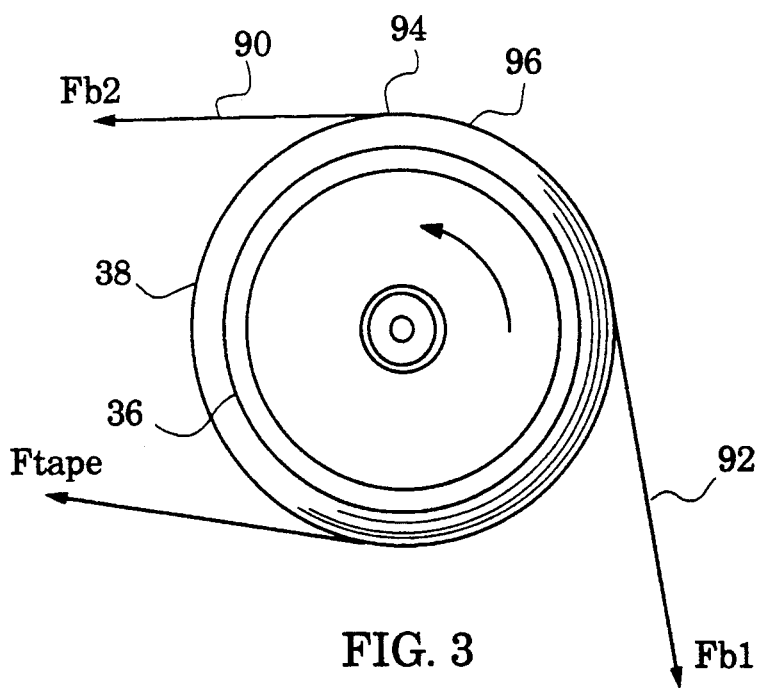
FIG. 3 is an illustration of belt and tape tensions on a take up reel of the tape cartridge of FIG. 1.

FIG. 3 is an exemplary force diagram illustrating the tensions on belt 40 with reference, for example, to take up reel 36 of FIG. 1. Of course, either reel 36 or 34 (FIGS. 1, 2) can function as the take up reel depending upon the direction of tape motion. Fb1 represents the force exerted by the belt 40 when it moves onto the take up reel 36 from the belt guide roller 46 (FIG. 1) Fb2 represents the belt force applied by the belt 40 when it moves away from the take up reel 36 towards the belt drive roller 42 (FIG. 1). Ftape represents the tape tension when it is wound onto the take up reel 36. It can be seen that the belt tension is higher on the departure side 90 of the belt than on the incoming side 92 because the departure belt tension Fb2 is the sum of the tape tension Ftape and the incoming belt tension Fb1. For example, if the incoming belt tension Fb1 is 16 ounces and the tape tension Ftape is 3 ounces then the belt tension Fb2 on the departure side 90 has a tension of 19 ounces.

Therefore the belt 40 will be stretched more at the departure side 90 of the take up reel. This stretching will not occur instantaneously but over some distance between the departure point 94 and a slip point 96 upstream along the belt as determined by the coefficient of friction between the tape 38 and the belt 40. For a large coefficient of friction $\mu_1$ the distance between the departure point 94 and the slip point 96 will be small, while for a small coefficient of friction $\mu_2$, it will be large.

Figure 4:
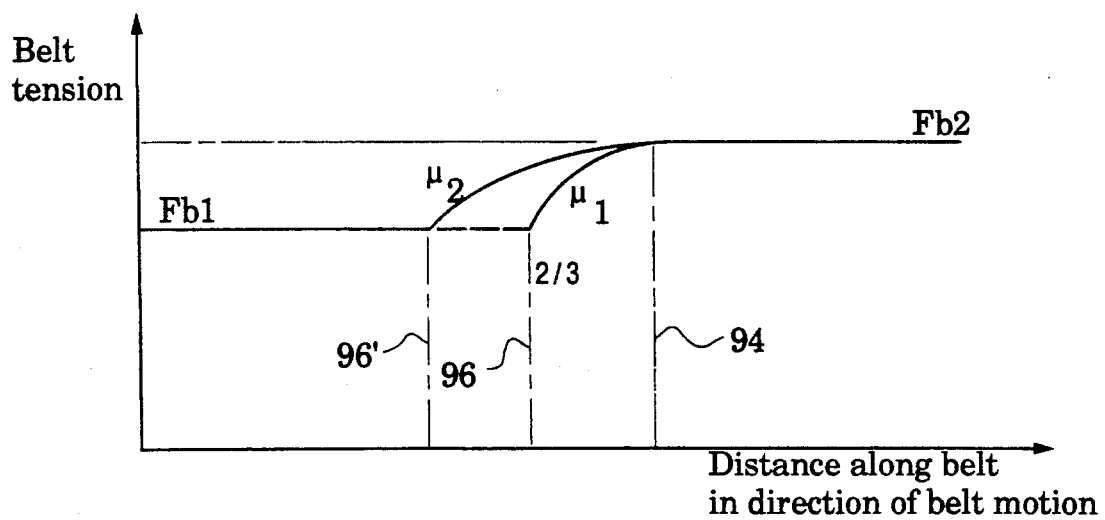
FIG. 4 is a graph of belt tension as a function of distance along the belt in the direction of belt motion on the take up reel of FIG. 3.

FIG. 4 is a graph of belt tension as a function of distance along the belt in the direction of belt motion on the take up reel of FIG. 3. For the large coefficient of friction $\mu_1$, the belt tension is Fb1 along the belt until the slip point 96 is reached. Once the belt has passed the departure point 94 the belt tension remains Fb2. In the transitional area between Fb1 and Fb2, the belt tension will follow a profile determined by the coefficient of friction. For a smaller coefficient of friction $\mu_2$, the slip point 96' is farther from the departure point 94.

When $\mu_1$ is the static coefficient of friction and $\mu_2$ the dynamic coefficient of friction of a belt, it can be seen from FIG. 4 that the profile being followed at a particular instant is determined by whether static or dynamic friction is dominant at that instant. Belts that have a high static coefficient of friction $\mu_1$ and a low dynamic coefficient of friction $\mu_2$ have a tendency to stick to the tape prior to slipping and stretching to a distance defined by the lower dynamic coefficient of friction $\mu_2$. The slip point 96, consequently, moves back and forth on the reel 36.

This type of oscillation is called slip-stick motion and has a detrimental effect on tape tension. The tape dynamically balances the torques on the take up reel and the stress variations of the belt on the take up reel will cause significant tape tension variations. These tape tension variations cause speed variations at the transducer head 60 (FIG. 1) which reduce the accuracy of data readout. The present invention is directed primarily to reducing the difference between the dynamic and static coefficients of friction, between the belt 40 and the tape 38, to thus reduce tape tension variations.

Figure 5A:
FIG. 5A is a sectional view, in accordance with the current invention, of a belt.

A preferred embodiment 100 of the belt 40 is illustrated in FIG. 5A which depicts a thin, flexible belt 100 made of Hytrel, a polyester elastomer material made by the DuPont Corporation. The dynamic to static coefficient of friction ratio of Hytrel and magnetic tape was measured to be approximately 1.2.

It was found that a belt of Hytrel having a surface roughness of less than 4 microinches produced tape speed variations at the transducer head 60 (FIG. 1) of approximately 8% over a tape speed range from 60 to 150 inches per second. Thus the belt 100 obtains a low static to dynamic coefficient of friction ratio with a relatively smooth surface. The use of such a smooth belt offers the advantage of lower manufacturing cost as compared to textured belts of the type described in aforementioned U.S. Pat. Nos. 4,581,189 and 4,466,564.

Figure 5B:
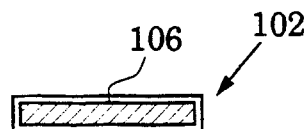
FIG. 5B is a sectional view, in accordance with another embodiment of the current invention, of a belt.

Another embodiment, in accordance with the current invention, is shown in the sectional view of FIG. 5B of a belt 102. The belt 102 has a thin coating 104 of a polyester over a base belt 106 made from a material with a high ratio of static to dynamic friction, for example Tuftane, a polyurethane made by Tuftane, Inc.

Figure 5C:
FIG. 5C is a sectional view, in accordance with another embodiment of the current invention, of a belt.

Another embodiment, in accordance with the current invention, is shown in the sectional view of FIG. 5C of a belt 108. The belt 108 has a fluorocarbon additive which will produce, with a magnetic tape, a low static to dynamic coefficient of friction ratio. It is understood that other additives or copolymers (mixture of 2 or more polymers creating a polymer with new properties) can be composed to obtain the desirable frictional characteristics of the belt.

Figure 5D:
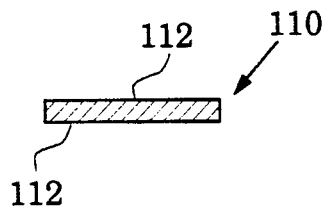
FIG. 5D is a sectional view, in accordance with another embodiment of the current invention, of a belt.

Another embodiment, in accordance with the current invention, is shown in the sectional view of FIG. 5D of a belt 110. The belt 110 has a macroscopic surface 112 which will produce, with a magnetic tape, a low static to dynamic coefficient of friction ratio. The macroscopic belt texture was obtained by passing the belt over a grinding wheel rotating at high speed. The grinding wheel had a granular structure such that the belt surface was ground having macroscopic lines or scratched typically 40 or more microns apart. The orientation of these grinding patterns can be longitudinal (in direction of belt motion) or at 45 degrees in a crosshatch fashion. It is believed that the macroscopic texture reduces the static friction but leaves the dynamic friction mostly unaffected.

It is understood that other methods of creating a macroscopic texture, for example through embossing or mold texturing, can be applied by those skilled in the art.

Thus a belt has been provided that will minimize tape tension variations in a belt driven tape cartridge by means of a minimized static to dynamic coefficient of friction ratio. Although the present invention has been described with reference to preferred embodiments, numerous modifications and rearrangements can be made with the equivalent result still embraced within the scope of the invention.

What is claimed is:

1. A tape cartridge comprising:
   a first reel mounted for rotation around its axis;
   a second reel mounted for rotation around its axis;
   a flat elongate magnetic tape extending between said reels having at least one end of said tape convolutely wound on one of said reels;
   tape guide means for bidirectionally moving said tape along a defined path from one of said reels to the other of said reels;
   a closed loop elongate drive belt having a drive surface;
   belt guide means supporting said drive belt for movement along a defined path maintaining an elongate portion of said drive surface in contact with an elongate portion of a surface of said tape;
   said belt drive surface being smooth and nontextured and having a frictional characteristic relative to said tape surface such that the ratio of static to dynamic coefficients of friction between said surfaces is less than 2.

2. A tape cartridge as defined in claim 1 wherein said belt drive surface has a roughness less than 4 microinches.

3. A tape cartridge as defined in claim 2 wherein said belt comprises an elastomer.

4. A tape cartridge as defined in claim 3 wherein said belt comprises Hytrel.

5. A tape cartridge as defined in claim 1 wherein said belt comprises a fluorocarbon polyester coating to obtain said static to dynamic coefficient of friction ratio.

6. A tape cartridge as defined in claim 1 wherein said belt comprises a fluorocarbon additive to obtain said static to dynamic coefficient of friction ratio.

7. A tape cartridge as defined in claim 1 wherein said belt comprises a mixture of polymers to obtain said static to dynamic coefficient of friction ratio.

8. A tape cartridge as defined in claim 1 wherein the surface of said belt has a macroscopic texture to obtain said static to dynamic coefficient of friction ratio.

* * * * *